Oct. 14, 1969    N. LAZARCHICK, JR., ET AL    3,473,078
PROPORTIONALIZED VELOCITY DEFLECTION SYSTEM
Filed Jan. 12, 1967    2 Sheets-Sheet 1

FIG.1

INVENTORS
NICHOLAS LAZARCHICK JR
KENNETH A. PEARSON

BY *Joseph J. Connerton*
ATTORNEY

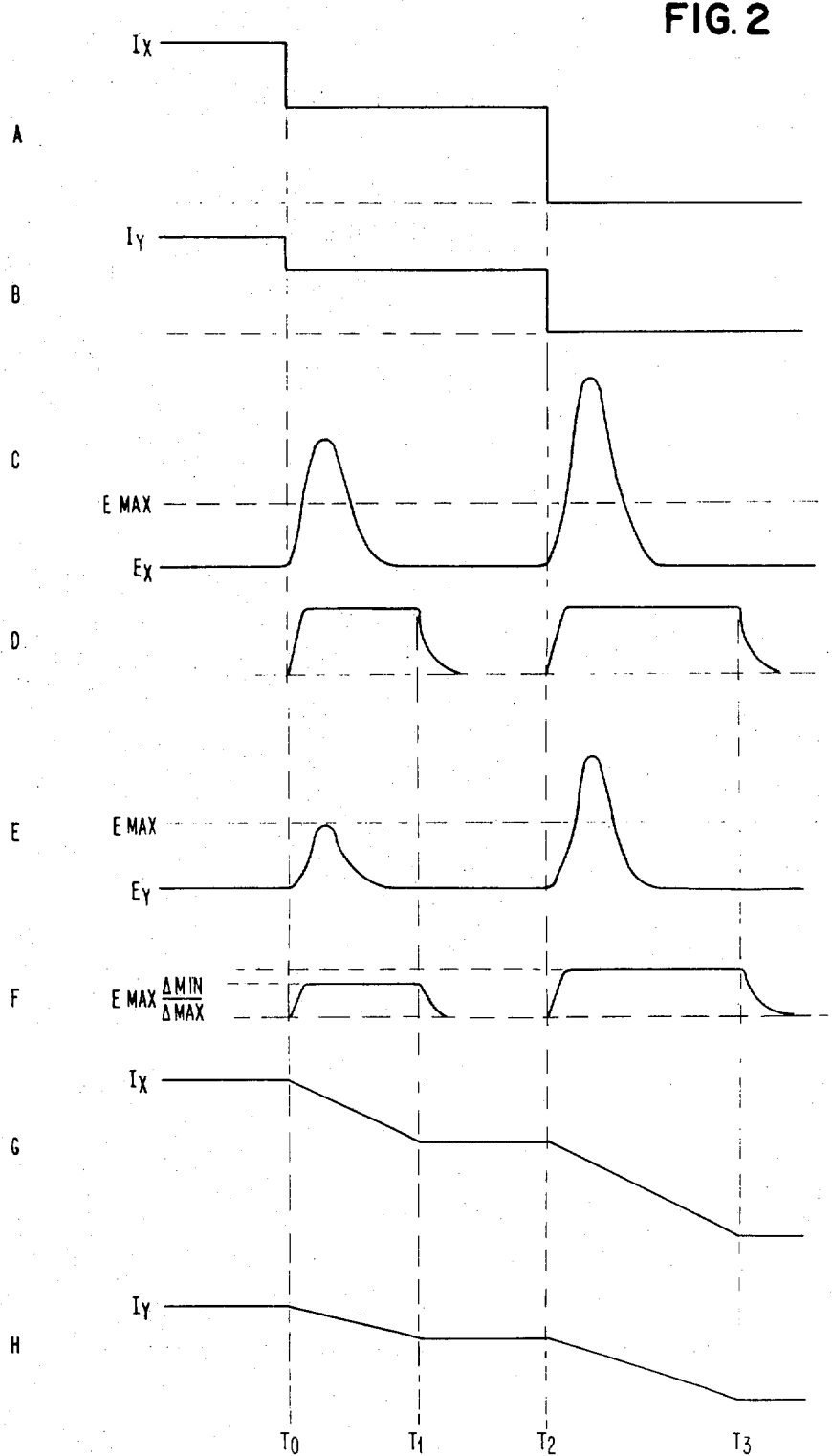

3,473,078
PROPORTIONALIZED VELOCITY DEFLECTION
SYSTEM
Nicholas Lazarchick, Jr., Rockville, Md., and Kenneth
A. Pearson, Kingston, N.Y., assignors to International
Business Machines Corporation, Armonk, N.Y., a corporation of New York
Filed Jan. 12, 1967, Ser. No. 608,806
Int. Cl. H01j 29/70
U.S. Cl. 315—18                                            10 Claims

ABSTRACT OF THE DISCLOSURE

A circuit for providing linear ramp currents for a magnetic deflection system wherein the velocity of the horizontal and vertical deflection signals are individually adjusted as a function of their respective magnitudes for each deflection of a cathode ray tube. The inductive kickback voltages from the horizontal and vertical windings of the deflection yoke are compared with proportionalized reference voltages, and the results of the comparison used to control the velocity of the individual deflection components. By causing the horizontal and vertical axes to track in this manner, a cathode ray tube beam is enabled to traverse to a designated coordinate intersection with the larger of the deflection components having a constant velocity, and the smaller component having a constant velocity which varies in accordance with its relative magnitude thereby enabling both deflection components to reach the designated coordinate intersection simultaneously.

BACKGROUND OF THE INVENTION

Field of the invention

The present invention relates to display systems and more particularly to a system for generating deflection signals for a cathode ray tube display in a constant velocity deflection system.

Description of the prior art

Broadly, cathode ray tube deflection is generally accomplished by one of two methods, the constant velocity-variable time system or the variable velocity-constant time system. Variable velocity deflection systems are generally less efficient than their counterpart systems in that they must be designed to accommodate maximum power changes which occur only during a major deflection. Such systems may be inefficient from a time basis, since constant time systems require the same time interval be expended to generate short and full screen vectors. Finally, since the display intensity varies inversely with the length the vector being generated. However, one of the problems quire a fairly elaborate intensity correction system to provide uniform intensity displays.

In the constant velocity-variable time deflection system, the amount of time required for beam deflection varies directly as the size of the vector being generated. Such systems are generally more efficient from a power standpoint, since they need not be designed for the worst situation, i.e., maximum deflection in minimum time, and automatically provide improved intensity control over the constant time interval irrespective of the length of the vector geing generated. However, one of the problems associated with the constant velocity deflection system is that of synchronizing tracking of the horizontal and vertical axes to generate linear vectors. This problem arises whenever either of the vector coordinate components magnitudes exceeds the other, since the velocities of the coordinates will normally be substantially proportional to the respective components magnitudes, and the larger component would require a longer interval to traverse its deflection than the smaller. One solution to this problem, as shown in copending application Ser. No. 519,717, now abandoned "Graphic Deflection System" filed by Donald J. Hinkein et al., Nov. 26, 1965, modifies the yoke clamping by a counter which, as it is stepped, repeatedly removes parallel damping resistors across the yoke in an attempt to maintain a linear ramp signal across the yoke. However, this system is intimately related to the characteristics of the specific yoke employed and must be aligned or calibrated for each yoke.

SUMMARY OF THE INVENTION

In accordance with the instant invention, there is provided a novel circuit designed to provide an improved constant velocity deflection system. In the preferred embodiment, a push-pull deflection system having two horizontal and two vertical yoke windings is provided, such windings being identified in the application as X, $\overline{X}$, Y and $\overline{Y}$, respectively. Deflection control signals identifying the vector endpoint coordinates in digital form are converted into ramp currents proportional to the individual changes in coordinate magnitudes. To cause both horizontal and vertical deflection components to reach their respective coordinate locations simultaneously, the individual deflection circuits are proportionalized, i.e., caused to traverse to their respective coordinate locations at constant but different velocities in accordance with their respective magnitudes. Effectively, a constant velocity system is converted to a constant time system for each vector generation cycle, but the constant time will vary as a function of magnitude of the largest of the coordinate deflections for each vector generation cycle. With each set of coordinate addresses, the horizontal and vertical changes are compared between the previous and the new coordinate intersection, the larger coordinate value identified and used to proportionalize the greater axial deflection at a predetermined value. The ratio of the smaller to the larger deflection change is determined and used as one factor to proportionalize the smaller axial deflection. Each of the proportionalized reference voltages are compared with the inductance "kickback" voltage from the yoke to provide a control signal, which is applied through a feedback circuit to limit the level or the kickback voltage to the proportionalized reference. When the proportionalized currents are applied to the magnetic deflection system, the resulting vectors will be linear, and the kickback voltages are maintained constant by the proportionalized linear ramp currents, thereby providing constant deflection velocities for each set of coordinates. Thus, the wave-shaping of the yoke current required for linearity is provided in the circuitry prior to the yoke and is independent of the specific yoke characteristics.

Accordingly, a primary object of the present invention is to provide an improved constant velocity magnetic deflection system for a cathode ray tube.

Another object of the present invention is to provide an improved constant velocity deflection system for causing the X axis to track with the Y axis by comparing the inductive kickback voltage from the magnetic yoke yith a reference voltage to provide proportionalized linear ramp currents.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIGURE 1 illustrates in block schematic form a preferred embodiment of the subject invention.

FIGURE 2 illustrates a family of waveforms eminating at various points within the logic diagram of FIGURE 1.

DESCRIPTION OF A PREFERRED EMBODIMENT

In the ensuing description, it is assumed that the blank and unblank control circuitry is of conventional nature and beyond the scope of the instant invention, and the details thereof have accordingly been omitted from the drawings in the interest of clarity. With respect to the instant invention, a vector may be defined as a line interconnecting two specified coordinate locations on the screen of a cathode ray tube. The invention will be described in terms of push-pull deflection system, although, as previously indicated, the principles thereof are equally applicable to single ended deflection systems. Likewise, unless otherwise specified, the invention will be described in terms of positive logic, although it may obviously be implemented in any form of level, pulse, frequency or other logic.

Referring now to the drawings and more particularly to FIGURE 1 thereof, the CRT beam is initially positioned at the starting coordinate vector location by digital signals applied from a data source such as an associated data processor or storage device to the X and Y position registers 21 and 23 respectively. These signals are applied through cables 22 and 24 to digital to analog decoders 25 and 27 respectively, where they are converted into corresponding analog currents. Decoders 25 and 27 may be any one of various known types of converters which convert a multi-bit digital signal into a corresponding analog potential. One example of a decoder adapted to generate push-pull deflection signals from digital control signals which may be employed in the instant invention is shown in U.S. Patent 3,325,803, "Deflection Control Circuit" filed by Frank R. Carlock et al., Oct. 1, 1964.

After the beam is positioned at the initial endpoint of the vector to be drawn, a second set of digital signals identifying the terminal coordinate address of the vector is applied to the X and Y position registers 21 and 23. The resultant change in the output level from decoders 25 and 27, in response to the second endpoint address, represents the relative difference or $\Delta$ quantity between the vector coordinate addresses. These delta signals labeled as and hereinafter designated as $\Delta X$, $\Delta X'$, and $\Delta Y$, $\Delta Y'$, are sensed by associated capacitors 29, 31, 33, 35 respectively, and applied to a comparison circuit 37 labeled $\Delta X \Delta Y$ COMPARE. Both the X, Y and X', Y' inputs are employed since the preferred embodiment operates in a push-pull mode, but only the positive signal of each coordinate is utilized. By utilizing diodes at the input to compare circuit 37, the negative signals are suppressed and comparison takes place between two positive signals. Compare circuit 37 compares the two signals and generates three outputs, a signal on output 49 designating in absolute from which of the quantities is the greater, a quantity hereinafter designated $\Delta_{max.}$, a signal on line 41 identifying the lesser $\Delta$ quantity, designated $\Delta_{min.}$, and a control signal on line 42 designating which of the delta quantities is the larger. Comparator 37 may constitute any logical device capable of comparing two analog signals and providing these three outputs. Such devices are considered well known in the art and the specific details thereof have been omitted to avoid unnecessary "prolix." The delta signals are applied to a function generator 43 which generates two signals, a proportionalized threshold level on line 45, hereinafter designated $E_{max.}$, and a second signal on line 47 identified as $$E_{max.} \cdot \frac{\Delta_{min.}}{\Delta_{max.}}$$

Since the vector velocity varies in proportion to the magnitude of the coordinate deflection and since $E = L\, di/dt$, the value $E_{max.}$ is selected to provide maximum vector velocity for the larger deflection component with greatest $di/dt$ change. The smaller proportionalized signal $$E_{max.} \cdot \frac{\Delta_{min.}}{\Delta_{max.}}$$

is the signal level which will cause the minor deflection to traverse to its coordinate position in the same amount of time as the larger. Since $E_{max.}$ represents only a voltage level and $$E_{max.} \cdot \frac{\Delta_{mix.}}{\Delta_{max.}}$$

a scaled signal level, and since the manner of generating these signals is not considered significant, the function generator 43 is shown in block form in the interest of clarity. Alternatively, the $\Delta_{min.}/\Delta_{max.}$ quantity could be computed in digital form at the input, converted to analog form and used to scale the $E_{max.}$ signal level. To clarify the ensuing description, assume that the $\Delta X$ quantity is the greater, indicating that the horizontal component of the vector is greater than the vertical component, and that $E_{max.}$ represents a predetermined threshold limit for the horizontal kickback voltage selected as heretofore described. Throughout the ensuing description, reference will be made, as appropriate, to the waveforms shown in FIG. 2. The proportionalized signals $E_{max.}$ and $$E_{max.} \cdot \frac{\Delta_{min.}}{\Delta_{max.}}$$

are applied via lines 45 and 47 to an electronic switch 50, which transfers these signals to output lines 51 and 53 in accordance with the condition of control line 42. Control line 42, labeled $\Delta X > \Delta Y$, is controlled from the $\Delta X \Delta Y$ COMPARE circuit 37. When $\Delta X > \Delta Y$, as in the assumed example, $E_{max.}$ and $$E_{max.} \cdot \frac{\Delta_{min.}}{\Delta_{max.}}$$

are transferred via lines 51, 53; when the control conditions are reversed, $\Delta Y > \Delta X$, the $E_{max.}$ and $$E_{max.} \cdot \frac{\Delta_{min.}}{\Delta_{max.}}$$

proportionalized signals are on lines 53, 51 respectively. In view of the push-pull operation of the invention, the proportionalized signal outputs from switch 50 are also applied to the X' and Y' comparators 56 and 58 respectively. The X and X' comparators 55 and 56 are connected through diodes 61 and 63 to opposite ends of the horizontal yoke windings 59 and 59', while the Y and Y' comparators 57 and 58 are connected through diodes 67, 69 to opposite ends of the vertical yoke windings 65, 65' respectively. The center tap of the yoke winding is connected to a reference signal 60. In view of the identical circuit configuration for the X and Y deflection circuitry, only the operation of the X drive will be described in detail in the interest of clarity, since the circuit configurations and operation are identical except for the specific kickback voltage threshold.

As previously indicated, the subject invention operates by comparison of the kickback voltage from each yoke winding with a reference signal which will be either pulse waveform. The second pulse waveform in FIGURE 2(C), between $T_2$ and $T_3$, resulting from the larger negative step of deflection current shown in FIGURE 2(A), is also clipped at the $E_{max.}$ level and further extended as shown in FIG. 2(D), such that again the energy under the clipped waveform corresponds substantially to that initially under the unclipped kickback voltage. FIGURE 2(E) indicates the corresponding yoke kickback voltage for the vertical deflection step applied in FIGURE 2(B), while FIGURE 2(F) illustrates the clipped signal as determined by the value $$E_{max.} \frac{\Delta_{min.}}{\Delta_{max.}}$$

It is apparent from FIGURE 2(F) that the clipping level of the vertical reference varies with each deflection step, since the ratio of $\Delta_{min.}/\Delta_{max.}$ varies. FIGURE 2(G) shows the corresponding ramp current applied to the X deflection winding, while FIGURE 2(H) shows the ramp deflection signal applied to the Y winding. Since $E_{max.}$ is equal to $2Ldi/dt$ where 2L represents the inductance of windings 59 and 59′, and both $E_{max.}$ and 2L are constants, the slope of the ramp in FIGURE 2(G), $di/dt$, is constant irrespective of its relative magnitude. However, in the case of the Y ramp signals in FIGURE 2(H), the slope will vary since it depends on a variable, the ratio $E_{min.}/E_{max.}$, which can vary with each pair of deflection signals applied thereto. From the waveforms of FIGURE 2, the following observations may be made. The larger proportionalized voltage, $E_{max.}$, has a constant amplitude and its duration will vary as a function of its deflection component magnitude. However, the slope of the resultant ramp signal is constant irrespective of its magnitude. The smaller proportionalized voltage $$E_{max.} \frac{\Delta_{min.}}{\Delta_{max.}}$$

will have the same duration as the $E_{max.}$ signal, but its level and slope will vary with each change in deflection due to the variation of the ratio $\Delta_{min.}/\Delta_{max.}$.

Returning now to FIGURE 1, the cross-coupled deflection driving circuitry employed in the present invention operates in the following manner. Each yoke winding has a damping resistor connected thereacross which, combined with the inductance and the stray capacitance of the winding, determines the time constant of the circuit. The time constant will normally be adjusted to conform to the time required for the proportionalized signals such as shown in FIGURES 2(D) and 2(F) to settle down between successive deflections. The yoke sections 59 and 59′ are connected to the collectors of buffer transistors 83 and 85, and then through Zener diodes 79 and 81 to their respective current source which, in the preferred embodiment herein described, comprises output terminals 73 and 74 or horizontal decoder 25. When a step current decrease occurs at output terminal 73, a corresponding step increase of the same magnitude will occur at terminal 74. This results in inductive kickback voltages at terminals 93 and 95 of the X yoke winding 59 of opposite polarities. In the example herein described, the polarity at terminal 95 connected to X′ yoke winding 59′ is positive. This voltage is applied through diode 63 to the X′ comparator 56 for comparison with the reference $E_{max.}$ signal, a voltage level that was developed to limit the vector component magnitudes and which is not effected by the vectors position on the display. A reference voltage equal to $$E_{max.} \frac{\Delta_{min.}}{\Delta_{max.}}$$

is developed for the Y coordinate reference. As the voltage at terminal 95 rises, it will reach a level corresponding to the $E_{max.}$ reference voltage, when the comparator 56 will commence to produce an error signal on line 72 indicating that the voltage at terminal 95 is greater than the reference voltage. This error signal on line 72 is applied to the base of transistor 77, turning transistor 77 on to a degree corresponding to the magnitude of the error signal. Transistor 75 will remain off since the voltage at terminal 93, due to its negative excursion, will never reach the $E_{max.}$ reference level. The conduction of transistor 77 slows up the reduction of current in the yoke winding 59′ by using some of the current supplied by output terminal 73. This effect is accomplished by the cross- coupling configuration wherein the emitter of transistor 75 is connected through resistor 81 to decoder terminal 73, and the emitter of transistor 77 connected through resistor 82 decoder terminal 74. This cross-coupling interconnection also prevents the fast rising current at terminal 74 from being used completely on the X yoke winding 59. The diversion by transistor 77 of some of the fast rising current provided at terminal 74 results in a slower rising current in the yoke winding 59. Since the currents through the yoke sections are now changing at a slower rate, the resulting kickback voltage, when compared with the reference voltage, will result in a reduction of conduction of transistor 77, allowing the currents to change at a slightly faster rate. This continuous feedback of the error signal developed by comparator 56 will cause the kickback voltage across the yoke sections to be stabilized at a relatively constant level, resulting in a linear change in current. This is illustrated graphically in the waveforms of FIGURES 2(G) and 2(H). If the Y component system had a greater step of input current, the reference voltage $E_{max.}$, applied in that case would be greater, thereby allowing the voltage on the Y yoke windings 65 and 65′ to be greater, causing the beam motion in the vertical direction to be faster. If the current and polarity of the X deflection were reversed on terminals 74 and 73, the X comparator 55 would cause the transistor 75 to conduct, and transistor 77 would be turned off or inoperative. The current through the X yoke winding is a ramp signal as indicated in FIGURE 2(G). Simultaneously, the Y axis, the kickback voltage is made equal to the proportionalized voltage $$E_{max.} \times \frac{\Delta_{min.}}{\Delta_{max.}}$$

and the resultant current ramp to the Y yoke shown in FIGURE 2(H) has a different slope than the initial ramp because of the different reference level. Two comparators are employed for each deflection case because the kickback voltage can swing positive or negative, and only the comparator handling the positive swing will be operative. Through the above described circuitry, the reference voltage for the component whose signal is largest is specified, and the other component is given a value corresponding to its magnitude but translated to conform to a lower reference ceiling dictated by the ratio of its current to the current of the larger component. Stated another way, the above described circuitry corresponds to a servo-system in which one yoke component is maintained at a constant reference level but the other is adjusted for each deflection, thus providing a constant velocity for both components during each vector generation cycle, enabling both components to reach their termination point simultaneously, thereby providing a linear display.

While the invention has been particularly shown and described with reference to a preferred embodiment thereof, it will be understood by those skilled in the art that various changes in form and detail may be made therein without departing from the spirit and scope of the invention.

What is claimed is:
1. A deflection system comprising in combination
means for generating first and second proportionalized signals in response to signals specifying the endpoints of a vector,
said first proportionalized signal varying as a function of the amplitude of the major deflection,
said second proportionalized signal varying as a second function of the amplitude of said minor deflection, and
means for converting said first and second proportionalized signals into deflection control signals of constant but different velocities.
2. A device of the character claimed in claim 1 including a magnetic yoke having coordinate windings there- on, wherein said means for generating first and second proportionalized signals comprises means for determining the relative magnitude of the deflection signals defining the coordinate addresses of said vector, and means for deriving a function of the ratio of the minor to the major deflection signal.

3. A device of the character claimed in claim 1 wherein said first proportionalized signal varies in accordance with a predetermined reference, and said second proportionalized signal varies in accordance with said reference signal modified by said ratio function.

4. A system comprising in combination a cathode ray tube having beam generation means, beam deflection means and a screen, means responsive to signals identifying a first coordinate location on said screen for positioning said beam at said first location, means responsive to signals identifying a second coordinate location of said screen for generating first and second proportionalized deflection signals varying as functions of the relative magnitude of said coordinate signal values, and means responsive to said proportionalized deflection signals for generating linear ramp signals of constant velocity for each coordinate deflection component.

5. Apparatus of the type claimed in claim 4 wherein said beam deflection means includes a magnetic yoke having a winding for each axis of coordinate deflection.

6. Apparatus of the type claimed in claim 5 wherein said means for generating said first and second proportionalized voltages includes means for determining the relative axial deflection components.

7. Apparatus of the type claimed in claim 6 wherein the magnitude of said first proportionalized voltage varies in accordance with a predetermined reference level to control the deflection of the major axis.

8. Apparatus of the type claimed in claim 6 wherein the magnitude of said second proportionalized voltage varies as said predetermined reference level modified by a function of the ratio of said minor to said major deflection values.

9. Apparatus of the type claimed in claim 8 wherein said first and second proportionalized voltages are compared with the corresponding kickback voltage of said deflection windings of said yoke to generate deflection signals of constant velocities.

10. A vector generation system comprising in combination a cathode ray tube having beam generating means and a screen, beam deflection means including a magnetic yoke having coordinate windings thereon, means responsive to digital signals for positioning said beam at a first coordinate address on said screen, means responsive to digital signals representative of a second coordinate address on said screen for generating signals representative of the relative horizontal and vertical deflection values, means responsive to comparison of said relative deflection values for generating a signal representative of a function thereof, means for determining the higher of said relative deflection values, means for generating a first proportionalized voltage corresponding to the higher relative deflection signal, said first proportionalized voltage corresponding to a predetermined level, means for comparing said first proportionalized voltage with the kickback voltage in the corresponding coordinate yoke winding to generate a first control signal, means to generate a second proportionalized deflection voltage corresponding to said predetermined level modified by said function, means responsive to said second proportionalized voltage for generating a second control signal, and means responsive to said control signals for generating linear ramp signals of uniform duration and constant but different velocities to thereby provide a linear vector on said screen of said cathode ray tube.

References Cited

UNITED STATES PATENTS

| | | | |
|---|---|---|---|
| 3,205,488 | 9/1965 | Lumpkin | 315—18 X |
| 3,252,045 | 5/1966 | Griffin | 315—18 |
| 3,325,803 | 6/1967 | Carlock et al. | 315—18 X |

RODNEY D. BENNETT, JR., Primary Examiner

B. L. RIBANDO, Assistant Examiner